(12) United States Patent
Gaiser

(10) Patent No.: US 6,906,638 B2
(45) Date of Patent: Jun. 14, 2005

(54) SENSOR UNIT

(75) Inventor: Martin Gaiser, Alpirsbach (DE)

(73) Assignee: Vega Grieshaber KG, Wolfach (DE)

( * ) Notice: Subject to any disclaimer, the term of this patent is extended or adjusted under 35 U.S.C. 154(b) by 377 days.

(21) Appl. No.: 09/984,286

(22) Filed: Oct. 29, 2001

(65) Prior Publication Data

US 2002/0060627 A1 May 23, 2002

Related U.S. Application Data

(60) Provisional application No. 60/273,345, filed on Mar. 6, 2001.

(30) Foreign Application Priority Data

Nov. 17, 2000 (DE) .......................................... 100 57 057

(51) Int. Cl.$^7$ ............................................... H04Q 9/00
(52) U.S. Cl. ................. 340/870.07; 340/3.53; 340/310.01; 73/865.8
(58) Field of Search ....................... 340/870.01, 870.07, 340/3.53, 310.01; 73/865.8

(56) References Cited

U.S. PATENT DOCUMENTS

| | | | | | |
|---|---|---|---|---|---|
| 3,601,543 | A | * | 8/1971 | Maniere et al. | 370/438 |
| 4,271,505 | A | * | 6/1981 | Menot et al. | 370/400 |
| 4,689,736 | A | * | 8/1987 | Glaudel et al. | 700/19 |
| 5,717,385 | A | * | 2/1998 | Kogure | 340/3.53 |
| 5,740,031 | A | * | 4/1998 | Gagnon | 700/16 |
| 5,764,891 | A | * | 6/1998 | Warrior | 710/72 |
| 6,006,338 | A | * | 12/1999 | Longsdorf et al. | 713/340 |
| 6,338,283 | B1 | * | 1/2002 | Blazquez Navarro et al. | 73/865.8 |

FOREIGN PATENT DOCUMENTS

EP 0 949 447 10/1999

\* cited by examiner

*Primary Examiner*—Timothy Edwards, Jr.
(74) *Attorney, Agent, or Firm*—Nath & Associates PLLC; Gary M. Nath; Gregory B. Kang

(57) ABSTRACT

A sensor unit (9) for measuring a process magnitude and for producing a digital signal representative of the process magnitude exhibits an interface (3) for transmitting the digital signal in a network (5) that supports communication between a plurality of users.

5 Claims, 1 Drawing Sheet

SENSOR UNIT

Figure 1:
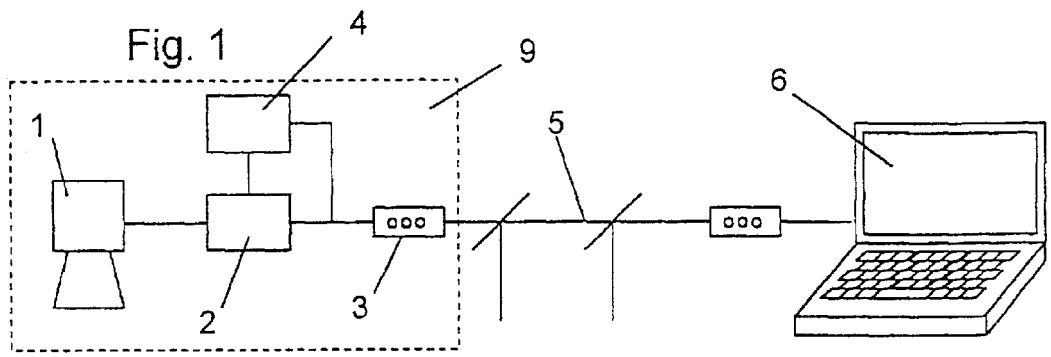

This application is a nonprovisional of U.S. provisional application No. 60/273,345 filed Mar. 6, 2001.

The present invention relates to a sensor unit for measuring process magnitudes, particularly as they are employed in the monitoring of industrial manufacturing processes.

In a manufacturing facility, sensors are often scattered over a number of points in order to measure magnitudes for the control of the production process. The measuring signals of the sensors must be conducted—frequently over considerable distances—to a guidance monitoring point, where they are correlated with each other and evaluated.

To avoid falsifying the measuring signals over long transmission paths at sometimes low signal amplitudes such monitoring tasks frequently employ sensor units which provide a digital output signal, since this kind of signal can be transmitted over long distances without loss of information. Wiring the sensor units to the guidance monitoring point remains complicated and expensive, however, even for digital transmission.

Another problem, which represents a peculiarity of digital transmission as compared to analog transmission, results from the arbitrary selection capability of formats in the digital display of the measured values. The zero and one levels can be linked with certain intervals of the voltage or current strength; the transmitter of the measured values may exhibit an active current or voltage, or it can be supplied passively with energy from the receiver via the data line and can signal various logical states to the receiver by changes in its load over this line. A transmitted bit sequence may represent a pure measured value or it may contain, in addition to the measured value, parity bits or other types of error identification information, etc. A consequence of this arbitrariness is the fact that digital sensor units and receivers from different manufacturers can hardly be employed together and that receivers, etc. are necessary for all separate wirings when a user is instructed to employ sensor units of different, non-compatible systems.

To solve the problem of wiring expense a sensor was proposed, e.g., in EP 0 949 447, to monitor a steam separator, where the sensor transmits digital signals by radio. To supply the energy needed for the radio transmission, this publication also proposes that the sensor be equipped with solar cells. When this is not practical due to insufficient illumination, there is no alternative, however, but to wire the sensor, this time for the supply of energy.

The goal of the invention is to create a sensor to measure process magnitudes which permits a digital measuring signal obtained by the sensor to be transmitted to a receiver in a standardized form, with simple means that can be obtained cheaply.

To this end it is proposed that the sensor be equipped with an interface for transmitting the digital signal in a network that supports communication between a plurality of users. Such networks are already present in most manufacturing plants, e.g., in the form of a telephone network or a local computer network (LAN). In inserting such a network, consequently, wiring does not have to be made from the sensor to the guidance monitoring point; a connection from the sensor to the nearest network access point is sufficient. Interfaces for networks, modems, or network adapters are produced in large quantities and can be obtained cheaply.

Ideally the sensor units will include a filling-level sensor. The container filling-levels measured by such sensors usually involve slowly changing magnitudes, and the rate at which data is delivered by an individual sensor unit is low. Consequently sensor units of this kind can be attached to the network in large number, without noticeably impeding the network's capacity for its originally intended tasks.

Figure 2:
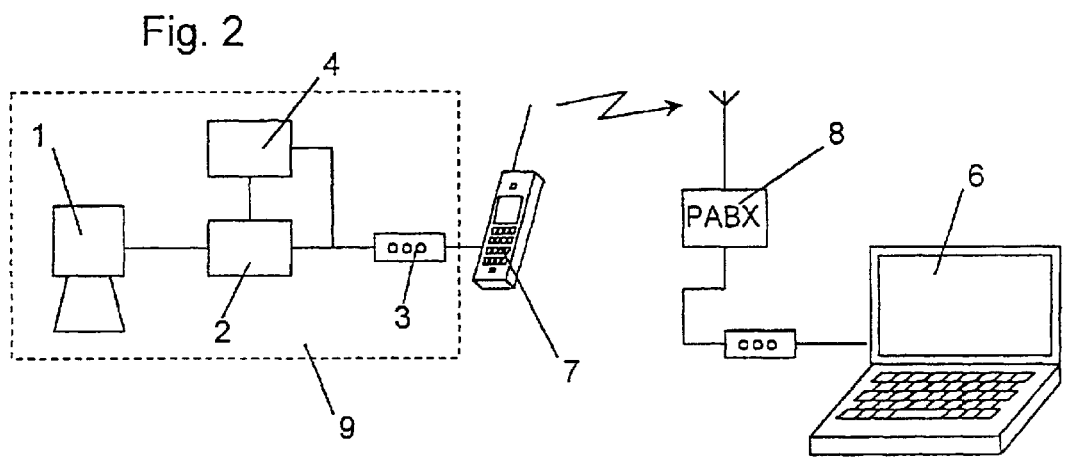

FIGS. 1 and 2 each show an inventive sensor unit, attached to a telephone network.

Attached to a signal outlet of the sensor 1 shown in FIG. 1—a filling-level sensor—is an interface transformer 2, which serves to convert the analog output signal of the sensor 1 into a digital signal, in a form that can be processed by an attached modem 3, e.g., eight or 16 bit parallel with TTL level.

A control unit 4 is attached to the modem 3 parallel to the interface transformer 2. This control unit can serve, e.g., to establish at regular intervals a command to establish a telephone connection over the modem 3 and the telephone network 5 (shown here only schematically as a cable) to a guidance monitoring point, e.g., a workplace computer 6, which is also connected to the telephone network 5 via a modem—the purpose of which is to transmit to the workplace computer 6 an actual measured value of the sensor 1 or a number of measured values collected and stored since the last connection, or to receive a call established by the workplace computer 6 and execute commands received from the workplace computer 6, e.g., a command to transmit measured values, to adjust the sensitivity of the sensor 1, or to adjust other parameters of the sensor 1 or the interface circuit 2.

The sensor 1, the interface transformer 2, the modem 3, and the control unit 4 are combined in a structural unit 9. To install this structural unit 9 it is sufficient to mount the unit on the container, or comparable structure, whose filling level is to be measured, and to lay a connecting cable from the sensor unit 9 to the nearest telephone connecting plug. The energy needed to operate the sensor 1 and the other components of the structural unit is drawn from the telephone plug via the connecting cable, so that the unit does not require its own power line for the supply of current.

As shown in FIG. 2, the same structural unit 9 can also be employed to transmit data with the aid of a cordless telephone terminal 7, e.g., a device according the DECT standard, and with the aid of a private branch exchange 8 adjusted to this device; the data is transmitted to the workplace computer 6. Since energy cannot be supplied over the telephone network 5 in this variant, a power source (not shown) connected to a cable is provided. It is also conceivable to integrate the transmitter-receiver unit employed by this kind of terminal device into the structural unit of the sensor.

In a second embodiment of the invention the modem is replaced by an interface for a local computer network, particularly by an ethernet adapter. This embodiment is preferred when small quantities of data must be transferred at short intervals of time, since here the data transmission is packet oriented and the previous connection structure, which is associated with time and signaling expense, is omitted.

Figure 3:
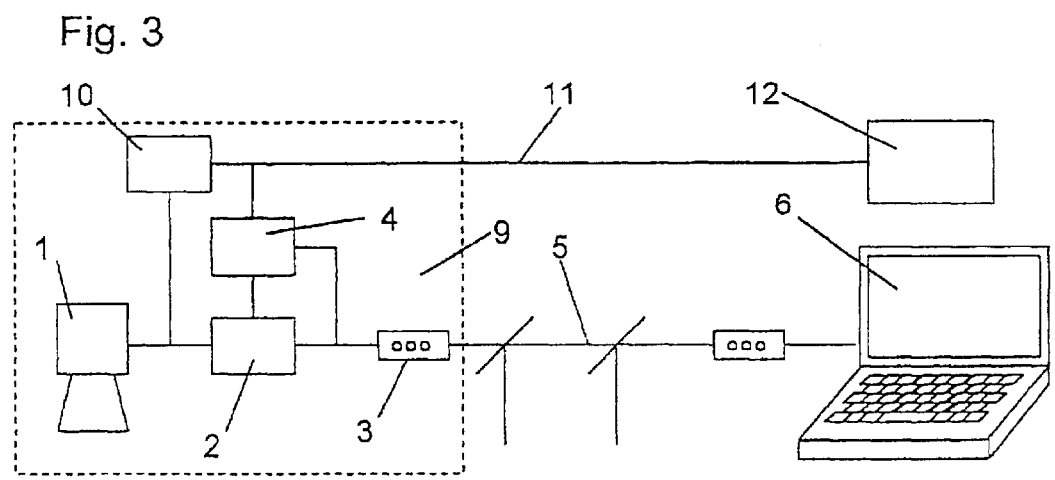

In a third embodiment depicted in FIG. 3 the sensor exhibits, in addition to the modem 3 for communication over a telephone network, a second interface 10 for communication with a network based on a fieldbus 11 such as HART, Profibus, or FF (Fieldbus Foundation). The fieldbus line serves to transmit measured values received by the sensor to a guide computer 12, e.g., an SPS (storage-programmable control) or a PLS (process guide system). The control unit 4 then serves to monitor both transmission paths.

In this embodiment, communication over the telephone line is employed only for interrogating and setting operating parameters of the sensor, e.g., in the context of remote parametering, maintenance, or diagnosis.

What is claimed is:

1. A sensor unit (9) for measuring a process magnitude and for producing a digital signal representative of the process magnitude,
   wherein said sensor unit exhibits at least one interface (3) for transmitting the digital signal in a network that supports communication between a plurality of users, and
   wherein said sensor unit exhibits an initial interface (3) in the form of a modem for communication with a telephone network (5) and a second interface to a LAN network.

2. A sensor unit according to claim 1, wherein said sensor unit includes a filling-level sensor.

3. A sensor unit according to claim 1, wherein the interface includes a modem (3) and the network is a telephone network (5).

4. A sensor unit according to claim 1, wherein the interface is a LAN interface and the network is a LAN.

5. A sensor unit according to claim 1, wherein the first interface serves to interrogate and/or set functional parameters of the sensor unit and the second interface serves to transmit measured values received by the sensor unit.

* * * * *